Dec. 20, 1960          E. A. MALICK          2,965,758
RADIOLOGICAL EXAMINATION OF HOLLOW ARTICLES
Filed Aug. 2, 1955          2 Sheets-Sheet 1
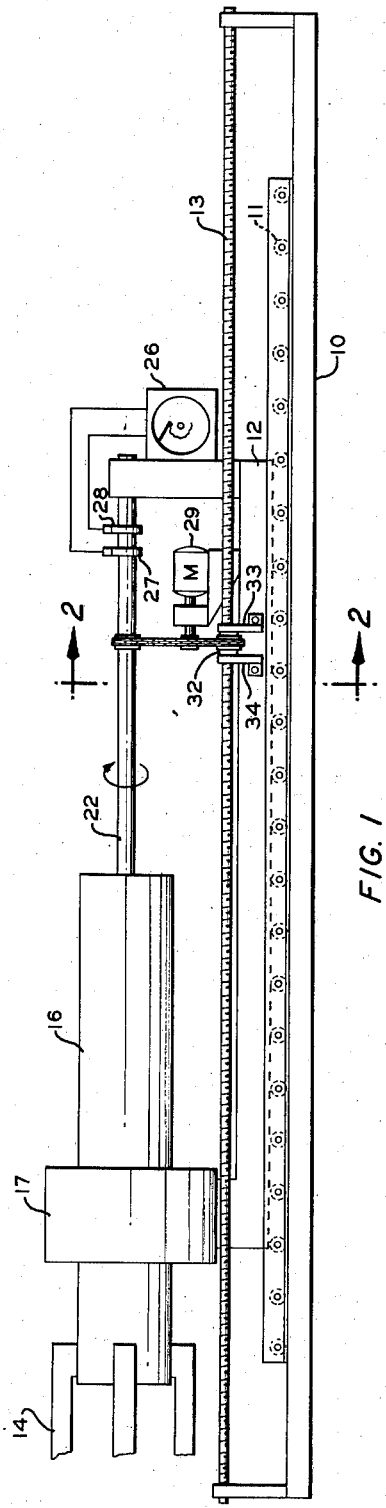
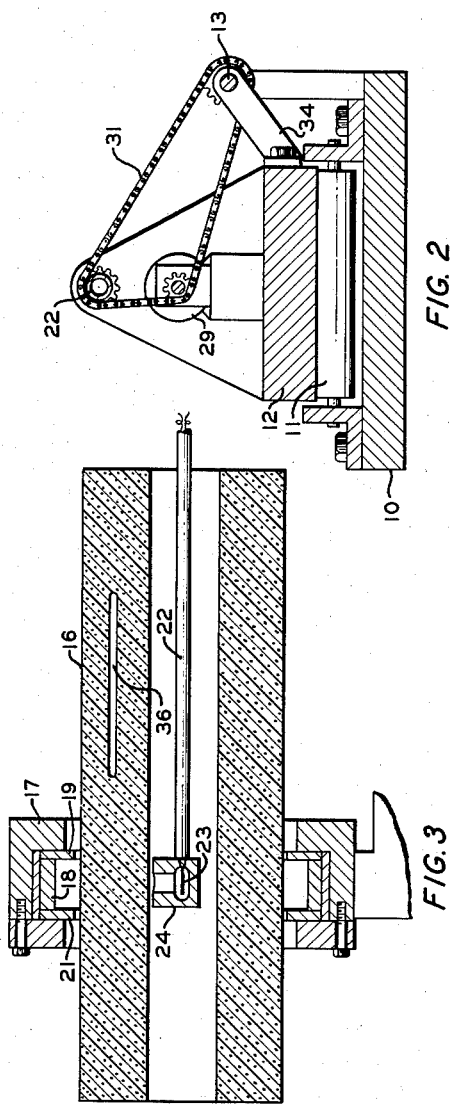
*INVENTOR.*
E. A. MALICK
BY
*ATTORNEYS.*

Dec. 20, 1960  E. A. MALICK  2,965,758
RADIOLOGICAL EXAMINATION OF HOLLOW ARTICLES
Filed Aug. 2, 1955  2 Sheets-Sheet 2
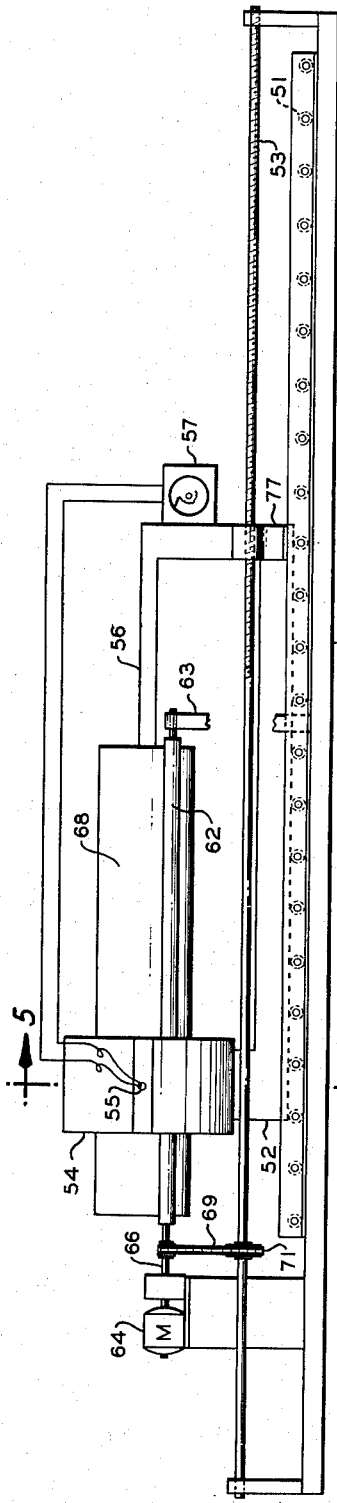
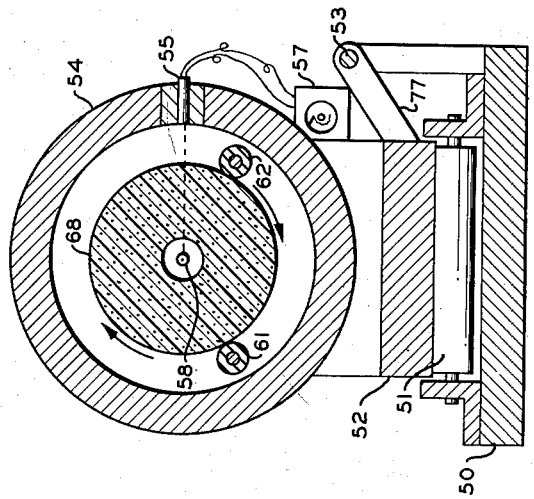
INVENTOR.
E. A. MALICK
BY
ATTORNEYS.

United States Patent Office 2,965,758
Patented Dec. 20, 1960

2,965,758

RADIOLOGICAL EXAMINATION OF HOLLOW ARTICLES

Emil A. Malick, McGregor, Tex., assignor to Phillips Petroleum Company, a corporation of Delaware Filed Aug. 2, 1955, Ser. No. 525,852

10 Claims. (Cl. 250—83.3)

This invention relates to radiological examination of hollow articles. In a further aspect this invention relates to a method of and apparatus for radiological examination of hollow articles whereby a complete examination of the article is possible to determine defects of any type.

For many years articles of various materials have been examined or tested by measuring the amount of radiant energy absorbed thereby when a source of radiant energy is placed on one side of the article and the amount of radiation measured on the other side thereof. This type of examination has been widely used for all types of hollow articles such as pipes, tubes, etc. In general these methods have involved the placing of a source of radiant energy within the article and determining the energy absorbed thereby by placing some kind of a detector outside the article. One disadvantage of such a system is that the energy measured is the sum of the energy passing through all sides of the article and a continuous imperfection running lengthwise of the article would not be apparent when such a method is used.

I have invented a method whereby such disadvantages are overcome. Broadly stated, my invention involves progressively detecting, on a rotating radius, changes in the energy absorbed by the article being examined. I have also invented apparatus for carrying out this invention.

The following are objects of this invention.

An object of this invention is to provide an improved method for the radiological examination of hollow articles. A further object of this invention is to provide apparatus for carrying out this invention. A further, and particular, object of this invention is to provide a method for examining rocket grains to insure that each grain is homogeneous.

Other objects and advantages of this invention will be apparent to one skilled in the art upon reading this disclosure.

Accompanying and forming a part of this disclosure is the drawing comprising,

Figure 1, a vertical side elevation of one modification of my invention,

Figure 2, a cross section view on line 2—2 of Figure 1,

Figure 3, a cross section view of the radiation source, the detector, and a hollow article, Figure 4, a view of another modification for carrying out the method of this invention, and Figure 5, an enlarged cross section view on line 5—5 of Figure 4.

Broadly stated, the apparatus of my invention is used to determine the absorption of radiation of a hollow article along a spiral path. While it is applicable to the examination of all types of hollow articles, the use for which the application is believed to be especially valuable is in the examination of rocket grains. Such grains are prepared by mixing an oxidant with a binder. As an example of such a grain, there can be mentioned ammonium nitrate, as the oxidant, with a rubber or asphalt binder. In the use of such grains, it is important that uniform burning be obtained and it is therefore necessary that the grain be perfectly homogeneous. Presently, such grains are made by a variety of processes including extrusion and casting. Where extrusion is employed, there is a possibility of striations running axially of the grain. Flaws known as "knotholes" appear in grains produced by other processes. Grains containing such imperfections will not burn with the desired characteristics. Since such flaws are within an opaque grain, visual examination of the exterior of the grain gives no indication of the internal characteristics thereof. Some system for determining the internal characteristics is necessary.

It is believed that a description of the accompanying drawings will provide the best method for an understanding of my invention. In Figure 1, one modification of my invention is shown. In this modification I provide a base 10, this base being provided with a plurality of roller bearings 11. A platform 12 rides on these roller bearings longitudinally of the base 10. Extending longitudinally of and mounted on base 10 is a screw 13. In this figure I have shown, diagrammatically, a support 14 for the hollow article 16 being examined. This support can be of any type suitable for rigidly holding article 16. In fact, when rocket grains are being extruded, they can be examined directly at the extrusion apparatus during extrusion and, in such a case, 14 would be the face plate of the extruder. Mounted upon platform 12 is a shield 17, shown in cross section in Figure 3. Within this shield is a source of radiant energy 18, this extending completely around an article being examined therein. Source 18 is held in position and the radiation therefrom is directed toward article 16 by guide members 19 and 21. Also mounted upon platform 12 is a rotatably mounted shaft 22, this shaft being provided with a detector of radiant energy 23, this detector being placed in the plane of shield 17. I prefer to use a scintillation detector as the detector 23 but Geiger counters, ionization chambers, etc., can also be used. Detector 23 is provided with a shield 24 so that it receives energy from only one direction. Indicating means is suitably connected to detector 23 so that changes in the energy absorbed can be determined. In this modification I have shown a recording indicator 26, connected through suitable wiring to slip rings 27 and 28. It is obvious that other indicating means could be used, such as alarm means, process control equipment, and the like. Also mounted on platform 12 is a motor 29. By means of suitable gearing and chain drive 31, this motor drives shaft 22 and a nut 32 on screw 13. Nut 32 rotates on a shaft, said shaft being mounted in support arms 33 and 34 rigidly connected to platform 12.

In the operation of this apparatus, a hollow article, such as a rocket grain, is mounted in support means 14. When motor 29 is energized, platform 12 moves longitudinally of the base 10 due to the rotation of nut 32 on screw 13. At the same time, shaft 22 is rotated, this causing rotation of detector 23 mounted within shield 24. With a source of radiant energy completely surrounding the article 26, it will be seen that changes in the amount of energy absorbed indicate changes in the article along a spiral path. In other words, this provides a method of progressively detecting energy absorbed on a rotating radius. In Figure 3, a rocket grain 16 is shown and I have shown a longitudinal void 36 therein. It is obvious that a complete chart of the internal structure showing this imperfection would be obtained as the grain was being examined.

My invention is not limited to any particular type of radiation source, the choice of the type of radiation used being well known in the art. Thus, it is known that alpha particles having very short range, up to 2 inches in air or approximately 0.003 inch of paper, and consequently could only be used to measure the thinnest foils. Of greater penetrating force are beta particles and positrons which have a range up to approximately 0.05 inch of paper. Neutrons, being uncharged, have a much longer range and protons and deuterons have a range intermediate alpha and beta particles. X-rays and gamma rays are of considerably greater penetrating power and would be the choice for examination of cylinders of considerable thickness and/or are made from materials of high absorption capacity. While directed sources of cosmic rays, including meson rays, are not commercially available, there is no reason to believe that such rays would not be suitable for use in this invention at a time when such rays are better understood.

In Figures 4 and 5, a modification is shown wherein the source of radiant energy and the detector are maintained in one plane and moved longitudinally of the grain being tested, in this modification the grain being rotated during examination thereof. More particularly, these figures show testing apparatus, this comprising a supporting base 50, this base being provided with a plurality of roller bearings 51. Mounted upon said roller bearings is a platform 52, this platform being capable of longitudinal movement along base 50. Also mounted on base 50 is a screw 53.

Mounted on platform 52 is a shield 54, said shield being provided with a detector of radiant energy 55, this detector can be of the same type used in Figure 1. Also mounted upon platform 52 is a support arm 56 and indicating means 57, said indicating means being connected to detector 55 through suitable wiring. Mounted on the end of support arm 56 and aligned with detector 55 is a source of radiant energy 58, as shown in Figure 5.

Support base 50 is provided with rotatable support bars 61 and 62, these being supported at one end by members 63. Motor 64 is mounted on support base 50 and is connected through suitable gearing to shaft 66. Shaft 66 is common with rotating support bar 62. If desired, rotating support bar 61 can also be driven but, this is not necessary. Arm 67 connects platform 52 and, through suitable gearing, screw 53.

In this modification, the grain being tested is indicated by numeral 68. In operation, grain 68 is placed upon support bars 61 and 62. Then operation of the motor drives these support bars and, through belt 69 and nut 71, drives screw 53. Operation of the motor then causes grain 68 to rotate and platform 52 to move longitudinally of supporting base 50. It is obvious, then, that the rotation of the grain and longitudinal movement of the platform, resulting in longitudinal movement of source 58 and detector 55, results in examination of grain 68 along a spiral path. This is the same examination obtained by the use of the apparatus of Figure 1. It is obvious that the grain could be moved longitudinally and the source and detector maintained stationary in order to accomplish the same result. In either event, discontinuities in the character of the grain would become apparent from one angular position of the detector to the next.

As many possible embodiments may be made of this invention without departing from the scope thereof, it is to be understood that all matter herein set forth is to be interpreted as illustrative and not as unduly limiting the invention.

I claim:

1. Apparatus for determining the characteristics of a hollow article having a longitudinally extending opening comprising, a source of radiant energy; a detector of radiant energy aligned with said source of radiant energy; one of said source and said detector being positioned within said longitudinally extending opening and the other positioned outside of said hollow article; means to provide relative movement of said article and said aligned source and detector so that radiation emitted from said aligned source and received by said detector traverses a longitudinally progressing rotating radius; and indicating means connected to said detector.

2. Apparatus for determining the characteristics of a hollow article comprising a rotating point detector of radiant energy; indicating means connected to said detector; a collimated source of radiant energy surrounding said detector, said detector and said source being spaced so that a hollow article passing therebetween will surround said detector and be within said source, and means to move a hollow article past said source perpendicular to the plane of said source and said detector.

3. Apparatus for determining the characteristics of a hollow cylinder comprising a rotating point detector of radiant energy; indicating means connected to said detector; a collimated source of radiant energy surrounding said detector, said detector and said source being spaced so that a hollow cylinder passing therebetween will surround said detector and be within said source; and means to move a hollow cylinder past said source perpendicular to the plane of said source and said detector.

4. Apparatus for determining the characteristics of a hollow article comprising, a supporting base; a platform mounted on said base to move longitudinally of said base; mounting means adapted to support a hollow article being tested lengthwise of said supporting base; a source of radiant energy mounted on said platform; said source being positioned to surround a hollow article when same is supported in said mounting means so that radiation is directed through the article; a rotatably mounted shaft mounted on said platform so as to extend into a hollow article when same is supported in said mounting means; a detector of radiant energy on the end of said rotatably mounted shaft, said detector being in substantially the plane of said source of radiant energy and adapted to receive energy from only one direction; indicating means operatively connected to said detector; and means to move said platform longitudinally of said base and to rotate said detector.

5. Apparatus for determining the characteristics of a hollow article comprising a supporting base; a plurality of roller bearings positioned on said base; a platform mounted on said roller bearings to move longitudinally of said base; mounting means adapted to support a hollow article being tested lengthwise of said supporting base; a source of radiant energy mounted on said platform, said source being positioned to surround a hollow article when same is supported in said mounting means, so that radiation is directed through the article; a screw mounted on said supporting base extending longitudinally of said base; a rotatably mounted shaft mounted on said platform so as to extend into a hollow article when same is supported in said mounting means, a detector of radiant energy on the end of said rotatably mounted shaft, said detector being in substantially the plane of said source of radiant energy and adapted to receive energy from only one direction; a motor mounted on said platform; a nut on said screw, a shaft supporting said nut, said shaft being mounted in support arms rigidly connected to said platform so that rotation of said nut results in movement of said platform longitudinally of said base; a gear on said rotatably mounted shaft; a chain drive connecting said nut, said gear and said motor, and indicating means operatively connected to said detector.

6. Apparatus for determining the characteristics of a hollow cylinder comprising means to move said cylinder simultaneously along its axis and rotationally about its axis, a source of radiant energy at the axis of the cylinder, a detector of radiant energy at the surface of the cylinder and in the plane of said source, indicating means connected to said detector, and a shield of sufficient size to surround said cylinder.

7. Apparatus for determining the characteristics of a hollow cylinder comprising, a platform mounted on said base; means to move said platform longitudinally of said base; means mounted on said platform to support and rotate about its axis a hollow cylinder being examined; a support arm mounted on said platform, the end of said arm extending into said hollow cylinder; a source of radiant energy mounted on the end of said arm extending into said hollow cylinder; a shield member mounted on said platform aligned with said source and adapted to encircle said hollow cylinder; a detector mounted in said shield; indicating means connected to said detector.

8. Apparatus for determining the characteristics of a hollow cylinder comprising a supporting base; a plurality of roller bearings positioned on said base; a screw extending longitudinally of said base and attached thereto at either end; a platform mounted on said roller bearings to move longitudinally of said base; a motor mounted on said platform; a pair of rotatable horizontal rotating support bars mounted on and above said base, said bars being adapted to support a hollow cylinder being examined, and at least one of said support bars being driven by said motor; a support arm mounted on said platform, the end of said arm extending into said hollow cylinder, a source of radiant energy mounted on the end of said arm extending into said hollow cylinder; a shield member mounted on said platform aligned with said source and adapted to encircle said hollow cylinder; a detector mounted in said shield; indicating means connected to said detector; drive means connecting said motor and said screw to provide rotation thereto; and a gear mounted on said platform operatively engaging said screw, rotation of said screw thereby imparting longitudinal movement to said platform.

9. The apparatus of claim 1 wherein said source of radiant energy is positioned within said longitudinally extending opening and said detector is positioned outside of said hollow article.

10. The apparatus of claim 9 wherein said source of radiant energy is an X-ray source.

References Cited in the file of this patent

UNITED STATES PATENTS

| | | |
|---|---|---|
| 2,675,482 | Brunton | Apr. 13, 1954 |
| 2,702,864 | McKee | Feb. 22, 1955 |